US010828818B2

(12) United States Patent
Iuliano et al.

(10) Patent No.: US 10,828,818 B2
(45) Date of Patent: Nov. 10, 2020

(54) SHEET EXTRUSION DIE

(71) Applicant: NORDSON CORPORATION, Westlake, OH (US)

(72) Inventors: Salvatore G. Iuliano, Eau Claire, WI (US); Dale P. Pitsch, Jim Falls, WI (US)

(73) Assignee: Nordson Corporation, Westlake, OH (US)

(*) Notice: Subject to any disclaimer, the term of this patent is extended or adjusted under 35 U.S.C. 154(b) by 590 days.

(21) Appl. No.: 15/594,788

(22) Filed: May 15, 2017

(65) Prior Publication Data

US 2018/0326642 A1    Nov. 15, 2018

(51) Int. Cl.
*B29C 48/255* (2019.01)
*B29C 48/08* (2019.01)
(Continued)

(52) U.S. Cl.
CPC .......... *B29C 48/2556* (2019.02); *B29C 48/07* (2019.02); *B29C 48/08* (2019.02); *B29C 48/2566* (2019.02); *B29C 48/268* (2019.02); *B29C 48/30* (2019.02); *B29C 48/3001* (2019.02); *B29C 48/305* (2019.02); *B29C 48/313* (2019.02); *B29C 48/92* (2019.02);
(Continued)

(58) Field of Classification Search
CPC ... B29C 48/2556; B29C 48/07; B29C 48/313; B29C 48/268; B29C 48/3001; B29C 48/2566; B29C 48/305; B29C 48/92; B29C 48/30; B29C 48/08; B29C 2948/926; B29C 48/255; B29C 48/25
See application file for complete search history.

(56) References Cited

U.S. PATENT DOCUMENTS

| 5,679,383 A | 10/1997 | Ryan et al. |
| 5,770,129 A * | 6/1998 | Monti ..................... B29C 48/30 |
| | | 264/40.1 |

(Continued)

FOREIGN PATENT DOCUMENTS

EP    3059067 A1    8/2016

OTHER PUBLICATIONS

European search report dated Oct. 16, 2018 for EP Application No. 18172290.

*Primary Examiner* — Michael M. Robinson
(74) *Attorney, Agent, or Firm* — Baker & Hostetler LLP

(57) ABSTRACT

An extrusion die includes a plurality of studs, a tuning assembly and a restrictor member. The tuning assembly comprises a wedge member, first and second adjustment members, and an adjustment control having a rotatable single point adjustment member. The wedge member is coupled to first ends of the studs and includes a first and second plurality of channels within. The first and second adjustment members have a plurality of protrusions, each of which is positioned within a respective one of the first and second plurality of channels. The restrictor member extends in the longitudinal direction and is coupled to second ends of the studs. Rotation of the single point adjustment causes each of the protrusions to move within each respective channel forcing the wedge member, the studs, and the restrictor member to move in a direction that is substantially perpendicular to the longitudinal direction.

19 Claims, 16 Drawing Sheets

(51) Int. Cl.
  *B29C 48/30*   (2019.01)
  *B29C 48/92*   (2019.01)
  *B29C 48/305*  (2019.01)
  *B29C 48/25*   (2019.01)
  *B29C 48/31*   (2019.01)
  *B29C 48/07*   (2019.01)

(52) U.S. Cl.
  CPC ............ *B29C 48/25* (2019.02); *B29C 48/255* (2019.02); *B29C 2948/926* (2019.02)

(56) References Cited

U.S. PATENT DOCUMENTS

| | | | |
|---|---|---|---|
| 6,017,207 A | 1/2000 | Druschel | |
| 9,815,237 B2 | 11/2017 | Juliano et al. | |
| 2013/0122131 A1* | 5/2013 | Sedivy | B29C 48/2556 425/150 |
| 2016/0243745 A1* | 8/2016 | Iuliano | B29C 48/30 |

* cited by examiner

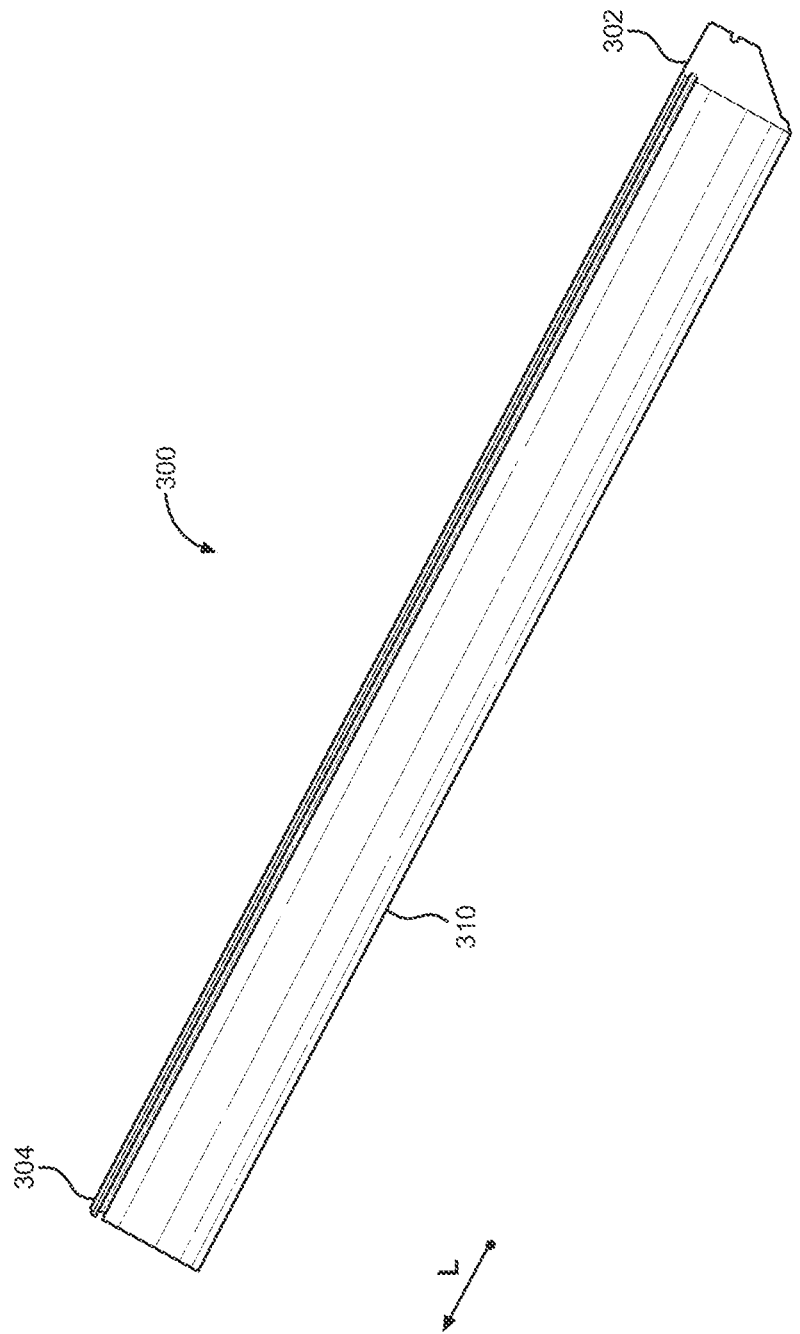

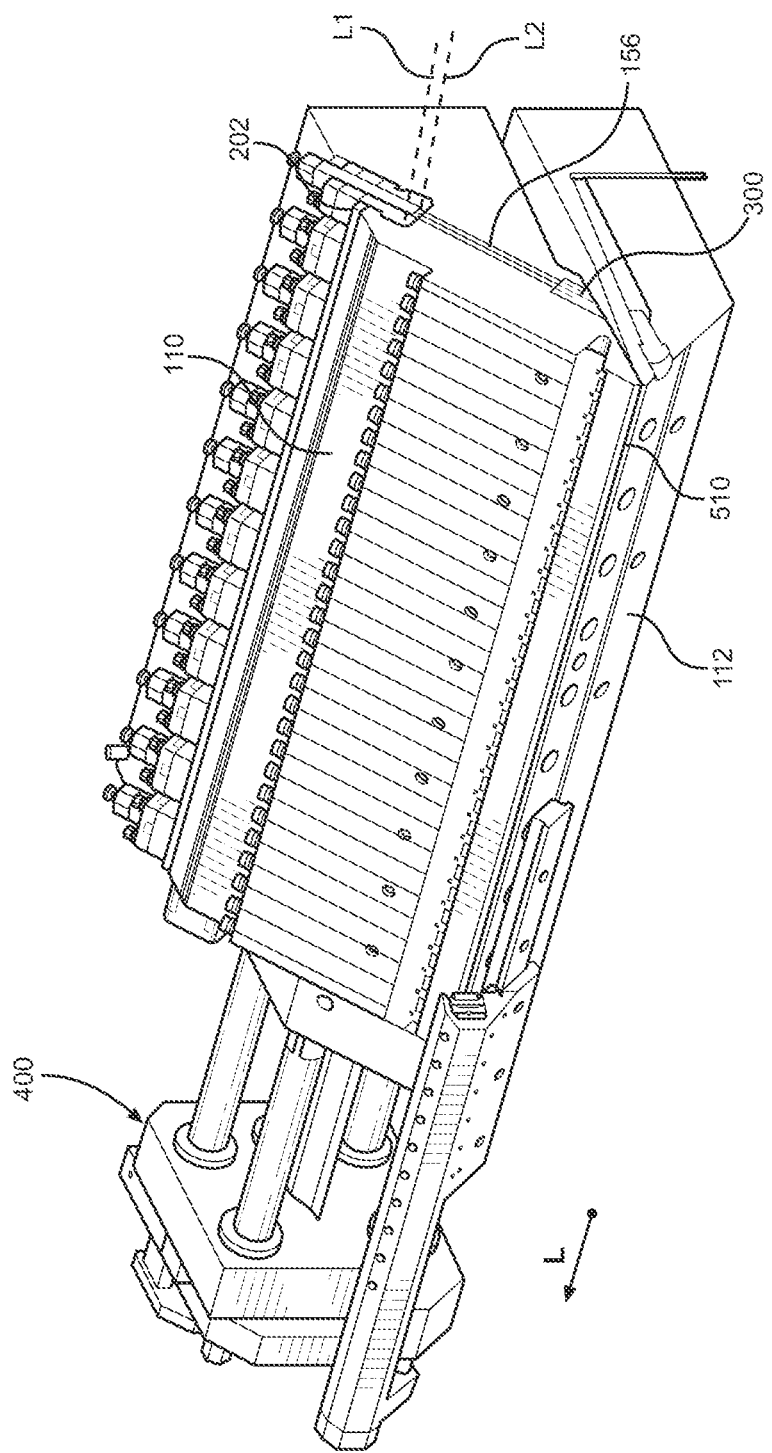

SHEET EXTRUSION DIE

TECHNICAL FIELD

The present disclosure relates to dies, and more particularly, to a sheet extrusion die that adjusts fluid distribution across an extrusion die using a restrictor bar having a tuning assembly.

BACKGROUND

Sheet extrusion dies are used for discharging molten polymer into a roll stack, and can include single-layer or multi-layer dies. A single-layer extrusion die delivers a single layer of molten polymer to a roll stack, whereas a multi-layer extrusion die delivers at least two layers of molten polymer to a roll stack. The molten polymer is forced out of a reservoir through a preland gap to a die lip exit by pressure, and this extrudate is fed to the roll stack.

To change the distribution of the molten polymer entering the roll stack, the shape of a distribution gap can be adjusted through the use of a restrictor bar or member. Current restrictor bars have a flat flow surface face and require bending or contorting to influence a flow distribution through an extrusion die. For example, the restrictor bar can be contorted to form a u-shape, m-shape, w-shape, or still other shapes. In conventional systems, restrictor bars rely on operator technique and experience to adjust properly. The restrictor bar can only bend gradually, and inexperienced operators often try to adjust the restrictor bar in ways that it cannot be bent, leading to damage. Improper adjustment of the restrictor bar can require additional tuning iterations, can result in broken or damaged restrictor bar studs and/or cause parts of the extrusion die to be out of calibration, and can lead to a product that is off specification.

Additionally, the operator may also leave the restrictor bar profile from a previous run and not refine it for new material or operating conditions because it is difficult to do. Therefore, the operator, or a subsequent operator, end up using other process variables, such as die heating zones or lip adjusters, to compensate which results in various process variables working against one another. As such, the current way of adjusting fluid polymer distribution with the restrictor bar reduces the processing window for a high quality product.

Therefore, there is a need for an improved system for adjusting the polymer distribution within an extrusion die.

SUMMARY

Disclosed herein is an extrusion die for dispensing molten polymer that includes a tuning assembly with a single adjustment point. The single adjustment point makes it easy to return to a previous position. The flow distribution can be "trimmed-in" from the single adjustment point, preventing erratic, asymmetrical or illogical adjustments from being made.

From a single adjustment point, an operator actuates a wedge member that adjusts the entire restrictor bar uniformly up or down. A flow surface face of the restrictor bar includes a machined preland. The preland has a longer land at center compared with the ends and promotes flow towards the ends of the die. Increasing the preland gap increases the flow towards the center of the restrictor bar. Reducing the preland gap increases the flow towards the ends of the restrictor bar. The single adjustment point and restrictor bar produces an effective way for balancing the flow distribution for a variety of molten polymer types and operating conditions, such as flow rate and melt processing temperature.

The extrusion die includes a plurality of studs, a tuning assembly, and a restrictor member. Each of the plurality of studs has a first end and a second end. The tuning assembly extends in a longitudinal direction and comprises a wedge member, a first adjustment member, a second adjustment member, and a single point adjustment member. The wedge member is coupled to the plurality of studs at a location proximate to each of the first ends of the plurality of studs. The wedge member has a first plurality of channels and a second plurality of channels formed within. Each of the first and second plurality of channels extends in a direction that is angularly offset from the longitudinal direction. The first and second adjustment members have a first plurality of protrusions and a second plurality of protrusions, respectively. Each of the first and second plurality of protrusions is positioned within a respective one of the first and second plurality of channels. The restrictor member extends in the longitudinal direction and is coupled to each of the second ends of the plurality of studs. Rotation of the single point adjustment member causes each of the plurality of protrusions to move within each respective one of the plurality of channels forcing the wedge member, the plurality of studs, and the restrictor member to move in a direction that is substantially perpendicular to the longitudinal direction.

The restrictor member includes a first surface and a preland. The first surface extends in a longitudinal direction from a first end of the restrictor member to a second end of the restrictor member. The preland is formed on the first surface. The preland has a preland surface that includes a first edge and a second edge. The first edge and second edge extend from the first end to the second end of the restrictor member. The second edge is spaced from the first edge in an axial direction. The axial direction is substantially perpendicular to the longitudinal direction. The second edge has a bend located between the first end and the second end of the restrictor member. A distance defined between the first edge to the bend in the axial direction is greater than a distance defined between the first edge to the second edge at the first end of the restrictor member in the axial direction.

Another aspect of the present disclosure provides a tuning assembly. The tuning assembly comprises a wedge member and an adjustment control with a single point adjustment member. The wedge member extends in a longitudinal direction and includes a first plurality of channels and a second plurality of channels formed within. Each of the plurality of channels extends in a direction that is angularly offset from the longitudinal direction. The tuning assembly includes a first adjustment member, a second adjustment member, and adjustment control with a single point adjustment member. The first and second adjustment members each have a plurality of protrusions, each of which is positioned within a respective one of the first and second plurality of channels. Rotation of the single point adjustment member causes each of the plurality of protrusions to move within each respective one of the plurality of channels forcing the wedge member to move in a direction that is substantially perpendicular to the longitudinal direction.

Another aspect of the present disclosure provides an extrusion die having a first end and a second end spaced from the first end in a longitudinal direction. The extrusion die comprises an upper body member, a lower body member, an internal manifold plug, and an external deckle. The upper body member and the lower body member extend from the first end to the second end of the extrusion die. The lower body member is positioned adjacent to the upper body member in a vertical direction. The vertical direction is substantially perpendicular to the longitudinal direction. A distribution channel, a preland channel, and a die opening are formed between the upper body member and the lower body member. The distribution channel, the preland channel and the die opening extend from the first end to the second end of the extrusion die and are spaced from one another in an axial direction. The axial direction is substantially perpendicular to the longitudinal direction and the vertical direction. The internal partial internal deckle or manifold plug is slidably positioned within the distribution channel. The external deckle is slideably positioned at the die opening.

This summary is provided to introduce a selection of concepts that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein:

FIG. 5A illustrates a top perspective view of a restrictor member.

FIG. 6 illustrates a perspective cross sectional view of the extrusion die shown in FIG. 1 taken along line 2-2.

DETAILED DESCRIPTION

An extrusion die for transferring a molten polymer to a roll stack (not shown), such as an extruded plastic sheet, is described. Unlike prior dies, the extrusion die described herein minimizes operator time to adjust a preland channel, prevents improper adjustment of the preland channel, evenly distributes the fluid after the preland channel is adjusted, which provides greater shift to shift consistency, reduces down-time, reduces part wear, and broadens the operating window. The extrusion die allows for highly effective flow distribution control from a single adjustment point making it is much more convenient to use than prior dies.

Figure 1:
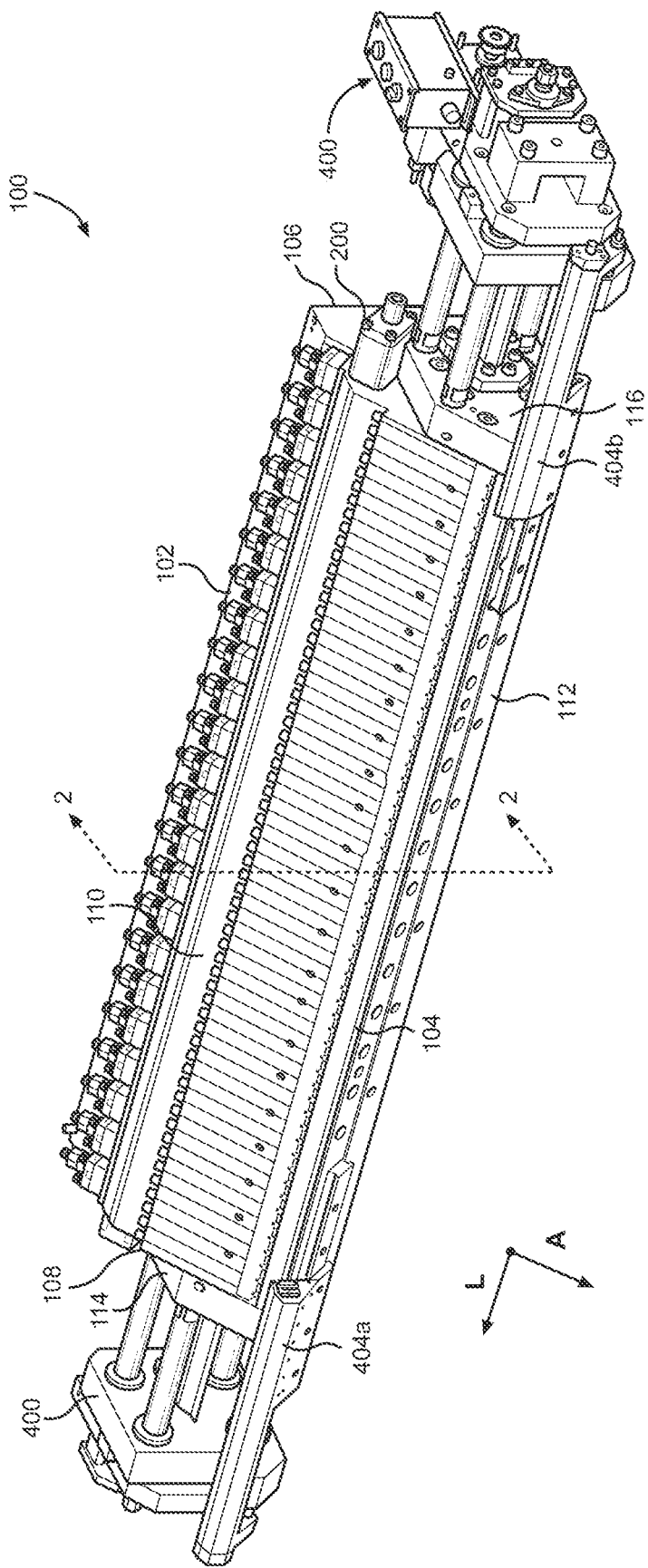
FIG. 1 illustrates a front perspective view of an extrusion die.

FIG. 1 provides a front perspective view of an extrusion die 100. The extrusion die 100 includes a back end 102, a dispensing end 104 spaced from the back end 102 in an axial or flow direction A, a first end 106 (e.g. right side), and a second end 108 (e.g. left side) spaced from the right side 106 in a longitudinal direction L. The dispensing end 104 is configured to discharge a fluid to a roll stack. The fluid may include molten polymer blends and the like. The extrusion die 100 may be supported by a base, floor mount, table top, or other support structure (not shown) to align the extrusion die 100 with the roll stack. In an aspect, the roll stack may be positioned adjacent to the dispensing end 104 during an application of fluid into the roll stack.

Certain terminology is used in the description for convenience only and is not limiting. The words "proximal" and "distal" generally refer to positions or directions toward and away from, respectively, an individual operating a cartridge assembly. The words "axial," "vertical," "transverse," "longitudinal," "left," "right," "upward," "downward," "above," and "below" designate directions in the drawings to which reference is made. The term "substantially" is intended to mean considerable in extent or largely but not necessarily wholly that which is specified. The terminology includes the above-listed words, derivatives thereof and words of similar import.

The extrusion die 100 includes an upper body member 110, a lower body member 112, a left end plate 114, a right end plate 116, a plurality of studs 156, a tuning assembly 200, a restrictor member or bar 300 (see FIG. 2), and a deckle system 400. The extrusion die 100 may also include thermally actuating automatic die lip adjusting bolts, or other components commonly used in extrusion dies. The upper body member 110 and the lower body member 112 are preferably manufactured from alloy tool steel with the flow surfaces being hard chrome plated. Alternatively, the upper body member 110 and the lower body member 112 may be manufactured from special alloys or other material having a high dimensional stability. It will be appreciated that the extrusion die 100 may include more body members, such as a center body member (e.g., dual layer dies) or multiple center body members (e.g., triple layer dies) configured to provide fluid with two or more layers.

Figure 2A:
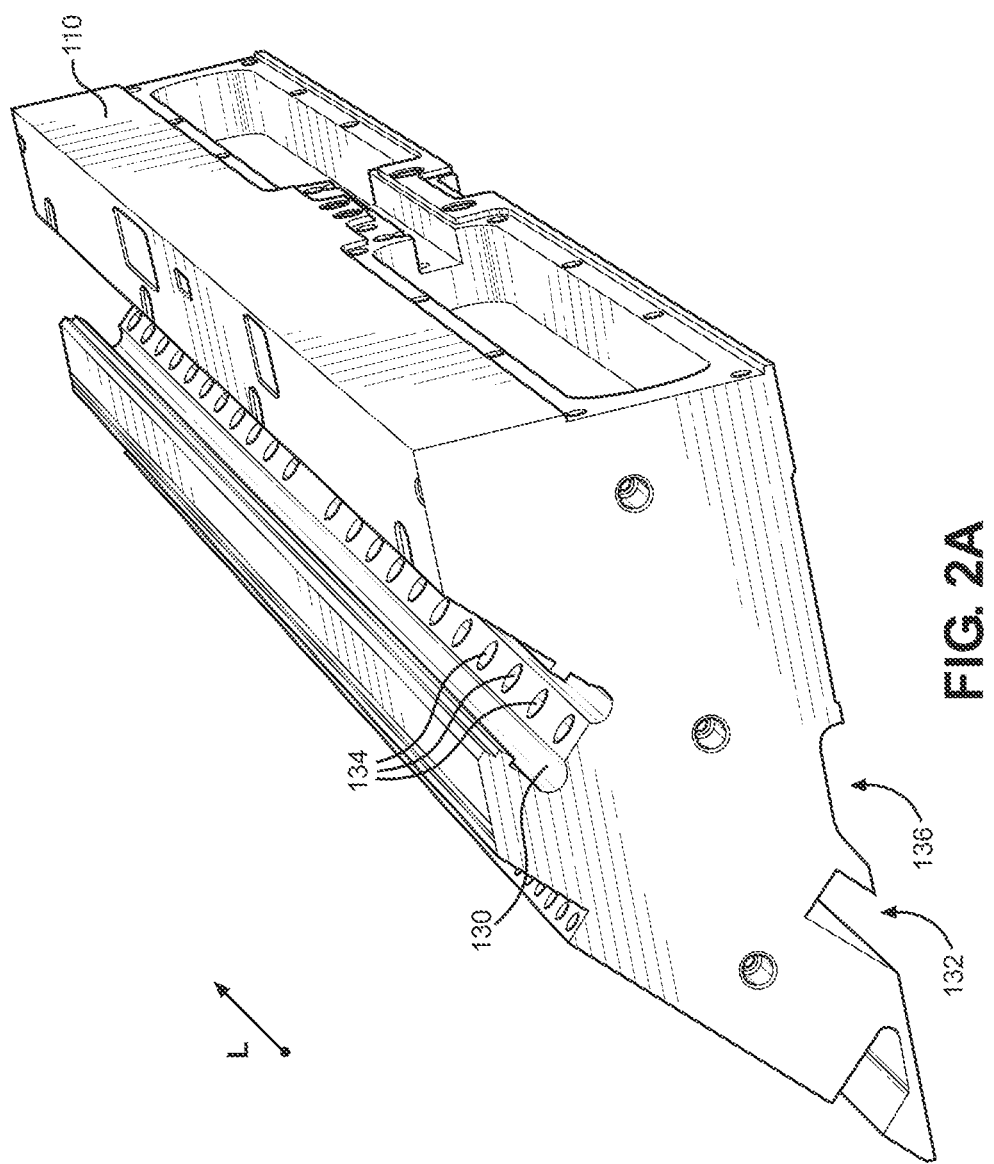
FIG. 2A illustrates a top perspective view of an upper body member of the extrusion die shown in FIG. 1.
Figure 2B:
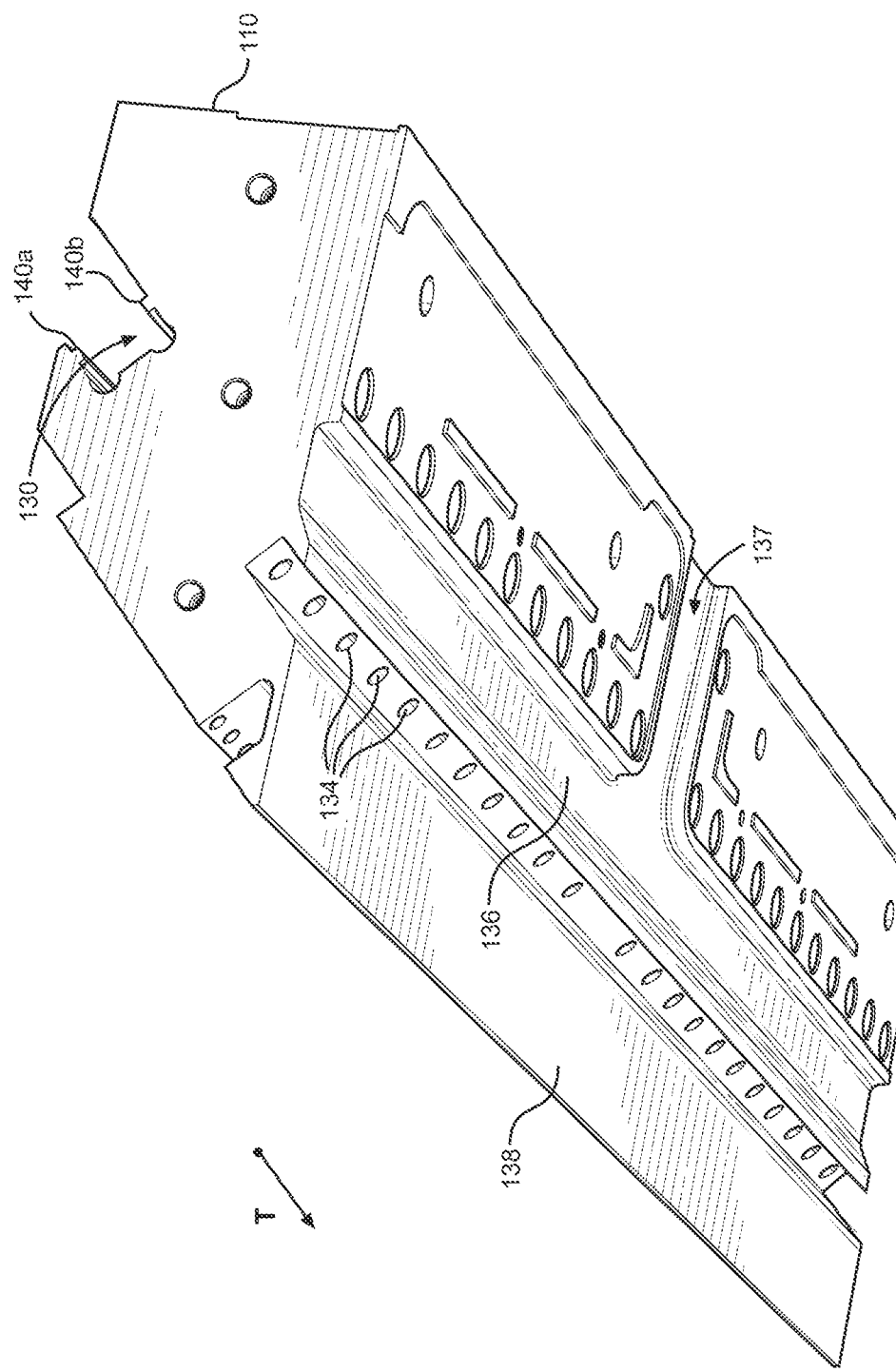
FIG. 2B illustrates a bottom perspective view of the upper body member shown in FIG. 2A

FIGS. 2A and 2B illustrate a top perspective view and a bottom perspective view of the upper body member 110, respectively. The upper body member 110 extends in the longitudinal direction L from the first end 106 to the second end 108 of the extrusion die 100. The upper body member 110 includes a tuning channel 130, a restrictor channel 132, a plurality of stud channels 134, an upper entry channel 136, and an upper port channel 137 formed within. The upper body member 110 includes an upper land surface 138. The tuning channel 130, the restrictor channel 132, and the upper entry channel 136 extend through the upper body member 110 in the longitudinal direction L. Each of the plurality of stud channels 134 extend through the upper body member 110 in a transverse direction T from the tuning channel 130 to the restrictor channel 132. The transverse direction T is substantially perpendicular to the longitudinal direction L. The upper port channel 137 extends from an outer surface of the upper body member 110 to the upper entry channel 136.

The upper body member 110 includes a first and second shoulder 140a and 140b that extend into the tuning channel 130. The first and second shoulders 140a,b extend in the longitudinal direction L and face each other.

Figure 3:
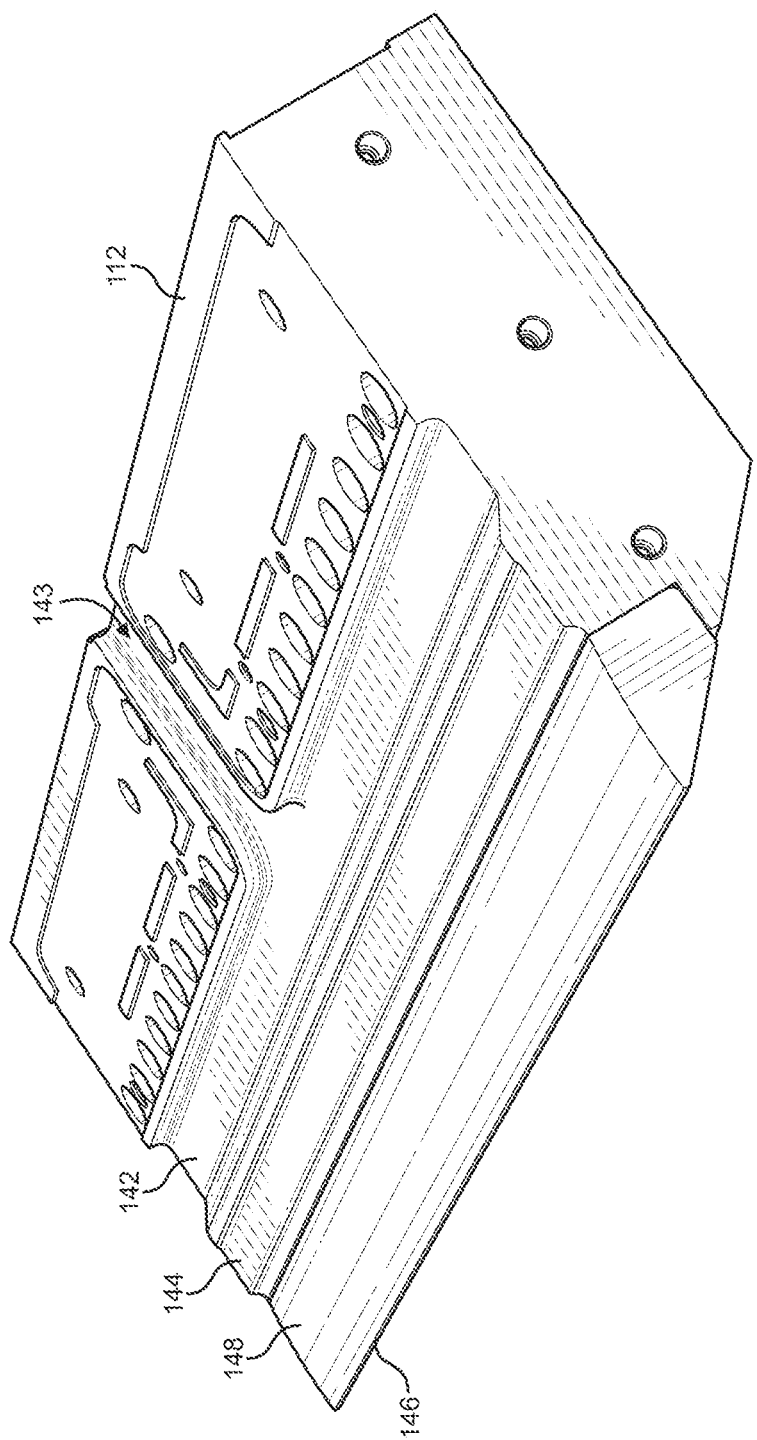
FIG. 3 illustrates a top perspective view of a lower body member of the extrusion die shown in FIG. 1.

FIG. 3 illustrates a top perspective view of the lower body member 112. The lower body member 112 extends in the longitudinal direction L from the first end 106 to the second end 108 of the extrusion die 100. The lower body member 112 includes a lower entry channel 142 and a lower port channel 143 formed within. The lower entry channel extends through the lower body member 112 in the longitudinal direction L. The lower port channel 143 extends from an outer surface of the lower body member 112 to the lower entry channel 142. The lower body member 112 includes a lower preland surface 144 and a final land member 146 that includes a lower land surface 148.

Figure 4A:
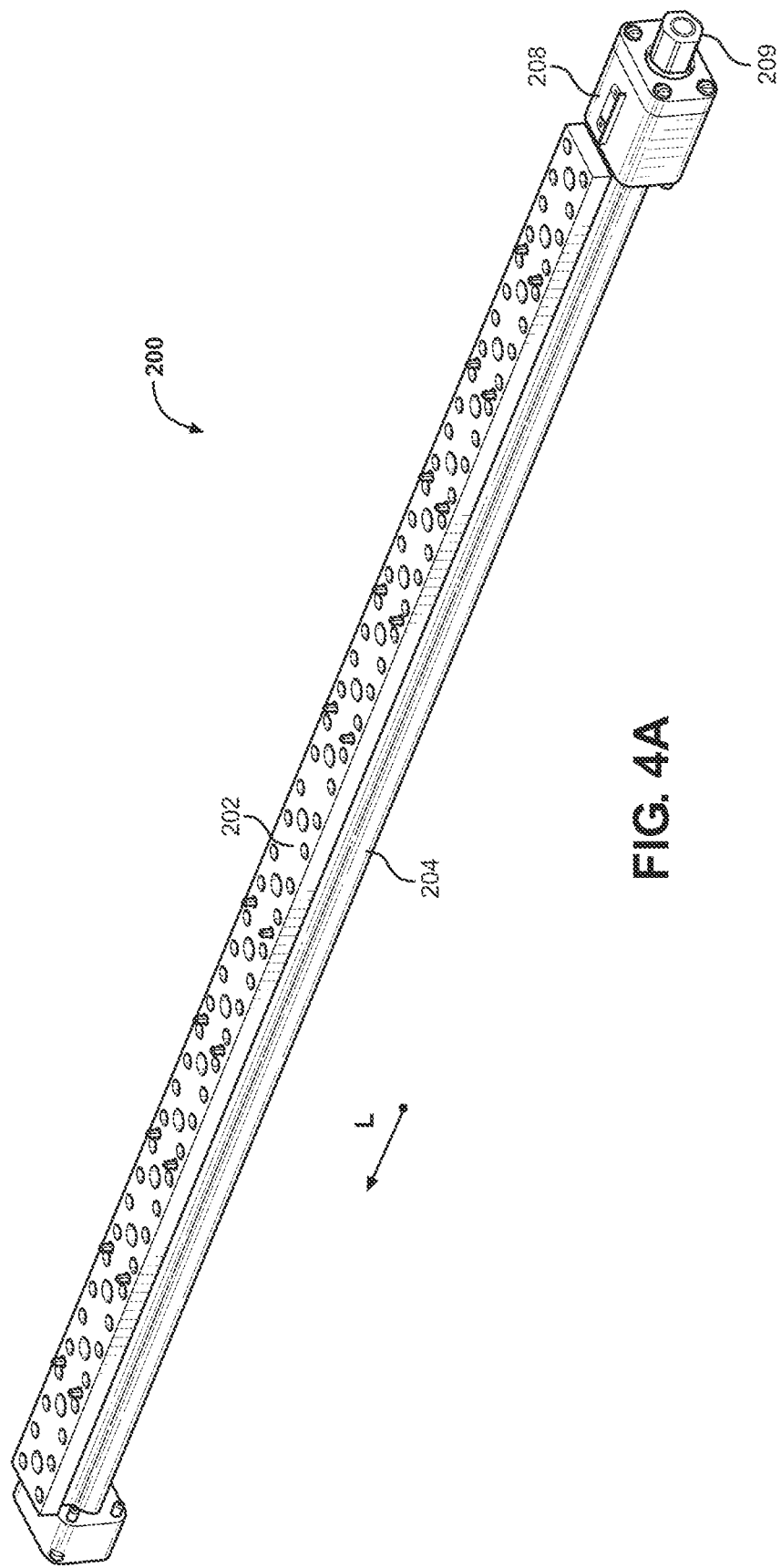
FIG. 4A illustrates a perspective view of a tuning assembly.

FIG. 4A illustrates a perspective view of the tuning assembly 200, according to an aspect of this disclosure. The tuning assembly 200 extends in the longitudinal direction L and includes a wedge member 202, a first adjustment member 204, a second adjustment member 206 (see FIGS. 4C and 7), and an adjustment control 208 having a single point of adjustment member 2069.

Figure 4B:
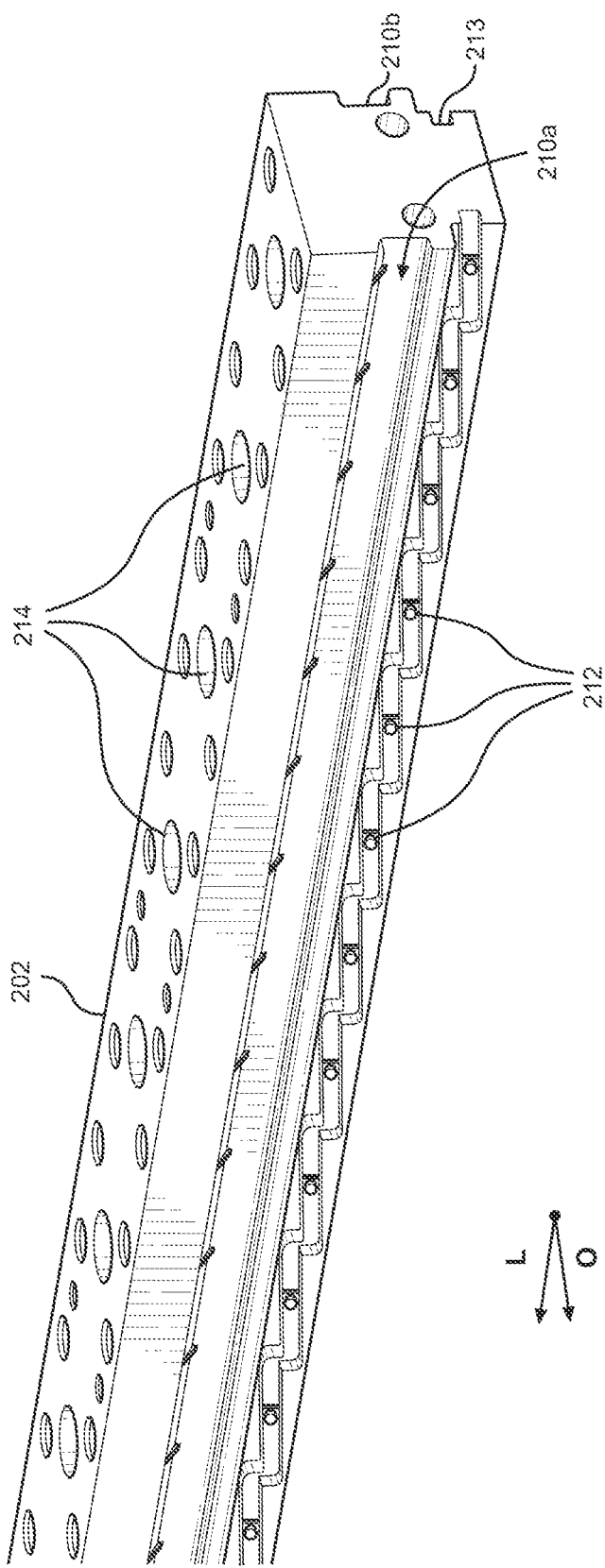
FIG. 4B illustrates a perspective view of a wedge member of the tuning assembly shown in FIG. 4A.

FIG. 4B illustrates a perspective view of the wedge member 202. The wedge member 202 includes a first notch 210a and a second notch 210b that both extend along an outer surface of the wedge member 202 in the longitudinal direction L. The wedge member 202 includes a plurality of wedge channels 212 formed within. The plurality of wedge channels 212 are aligned along the longitudinal direction L. Each wedge channel 212 extends in an offset direction O. The offset direction O is angularly offset from the longitudinal direction L. In an aspect, each of the wedge channels 212 may connect to each adjacent wedge channel 212 forming a z-shape channel extending along the wedge member 202 from the first end 106 to the second end 108 of the extrusion die 100. Alternatively, each wedge channel 212 may be separate from each other adjacent wedge channel 212, forming individual wedge channels 212 spaced along the wedge member 202 from the first end 106 to the second end 108 of the extrusion die 100.

It will be appreciated that the plurality of wedge channels 212 is a first plurality of wedge channels. The wedge member 202 also includes a second plurality of wedge channels 213 formed within, of which only one channel of the second plurality of wedge channels 213 is partially visible in the figures. The second plurality of wedge channels 213 are configured substantially similarly to the first plurality of wedge channels 212, and are positioned on a side of the wedge member 202 opposing the side of the wedge member 202 that includes the first plurality of wedge channels 212. The first plurality of channels 212 extend in a direction that is substantially parallel to a direction the second plurality of channels 213 extend, such that when viewed along the longitudinal direction they form mirror images of each other.

The wedge member 202 further includes a plurality of through holes 214 that extend through the wedge member 202. The through holes 214 are spaced along the wedge member 202 in the longitudinal direction L. In an aspect, each through hole 214 is spaced equidistant from each other adjacent through hole 214. The through holes 214 extend through the wedge member 202 in a direction substantially perpendicular to the longitudinal direction L.

Figure 4C:
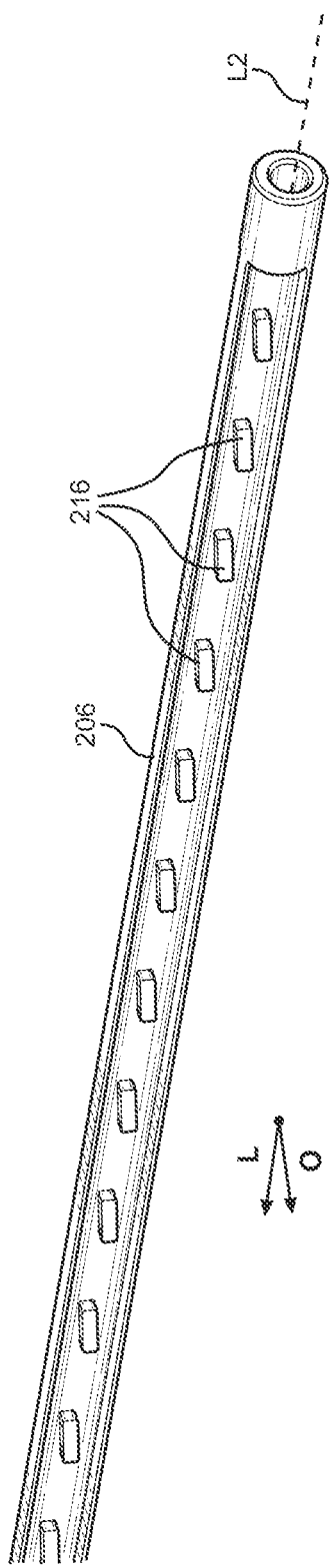
FIG. 4C illustrates a perspective view of an adjustment member of the tuning assembly shown in FIG. 4A.

FIG. 4C illustrates a perspective view of the second adjustment member 206. The second adjustment member 206 extends in the longitudinal direction L and includes a plurality of protrusions 216. The plurality of protrusions 216 are aligned along the longitudinal direction L, and each of the plurality of protrusions 216 extend in the offset direction O. It will be appreciated that the first and second adjustment members 204 and 206 are configured substantially similarly, and include mirror images of each other when viewed along the longitudinal direction L.

The wedge member 202 and the first and second adjustment members 204 and 206 are configured such that the plurality of protrusions 216 of the second adjustment member 206 are received within the second plurality of wedge channels 213 and a plurality of protrusions (not visible in figures) of the first adjustment member 204 are received within the first plurality of wedge channels 212. In an aspect, each of the plurality of protrusions of the first adjustment member 204 is positioned within a respective one channel of the first plurality of wedge channels 212, and each of the plurality of protrusions 216 of the second adjustment member 206 is positioned within a respective one channel of the second plurality of wedge channels 213.

The first adjustment member 204 is configured to move along a first longitudinal axis L1, and the second adjustment member 206 is configured to move along a second longitudinal axis L2. The first longitudinal axis L1 and the second longitudinal axis L2 extend substantially parallel to the longitudinal direction L. Movement of the first adjustment member 204 along the first longitudinal axis L1 in the longitudinal direction L and movement of the second adjustment member 206 along the second longitudinal axis L2 in the longitudinal direction L moves the wedge member 202 in a downward direction. Conversely, movement of the first adjustment member 204 along the first longitudinal axis L1 in a direction opposing the longitudinal direction L and movement of the second adjustment member 206 along the second longitudinal axis L2 in a direction opposing the longitudinal direction moves the wedge member 202 in an upward direction. As the first adjustment member 204 moves along the first longitudinal axis L1, each of the plurality of protrusions of the first adjustment member 204 slides within the respective one of the first plurality of the wedge channels 212. As the second adjustment member 206 moves along the second longitudinal axis L2, each of the plurality of protrusions 216 of the second adjustment member 206 slides within the respective one of the second plurality of the wedge channels 213. The movement of each of the plurality of protrusions within each respective wedge channel causes the wedge member 202 to move either in an upward or downward direction.

The adjustment control 208 is configured to control the movement of both of the first and second adjustment members 204 and 206. The adjustment control 208 moves both of the first and second adjustment members 204 and 206 simultaneously. The adjustment control 208 includes a single point adjustment member 209 (e.g. knob) coupled to the first and second adjustment members 204 and 206, such that when the knob 209 is rotated, the first and second adjustment members 204 and 206 move as described above. For example, if the knob 209 is rotated clockwise, the first adjustment member 204 moves along the first longitudinal axis L1 in the longitudinal direction L and the second adjustment member 206 moves along the second longitudinal axis L2 in the longitudinal direction L thereby moving the wedge member 202 in the downward direction. Conversely, if the knob 209 is rotated counter clockwise, the first adjustment member 204 moves along the first longitudinal axis L1 in the direction opposing the longitudinal L and the second adjustment member 206 moves along the second longitudinal axis L2 in the direction opposing the longitudinal direction thereby moving the wedge member 202 in the upward direction.

Figure 4D:
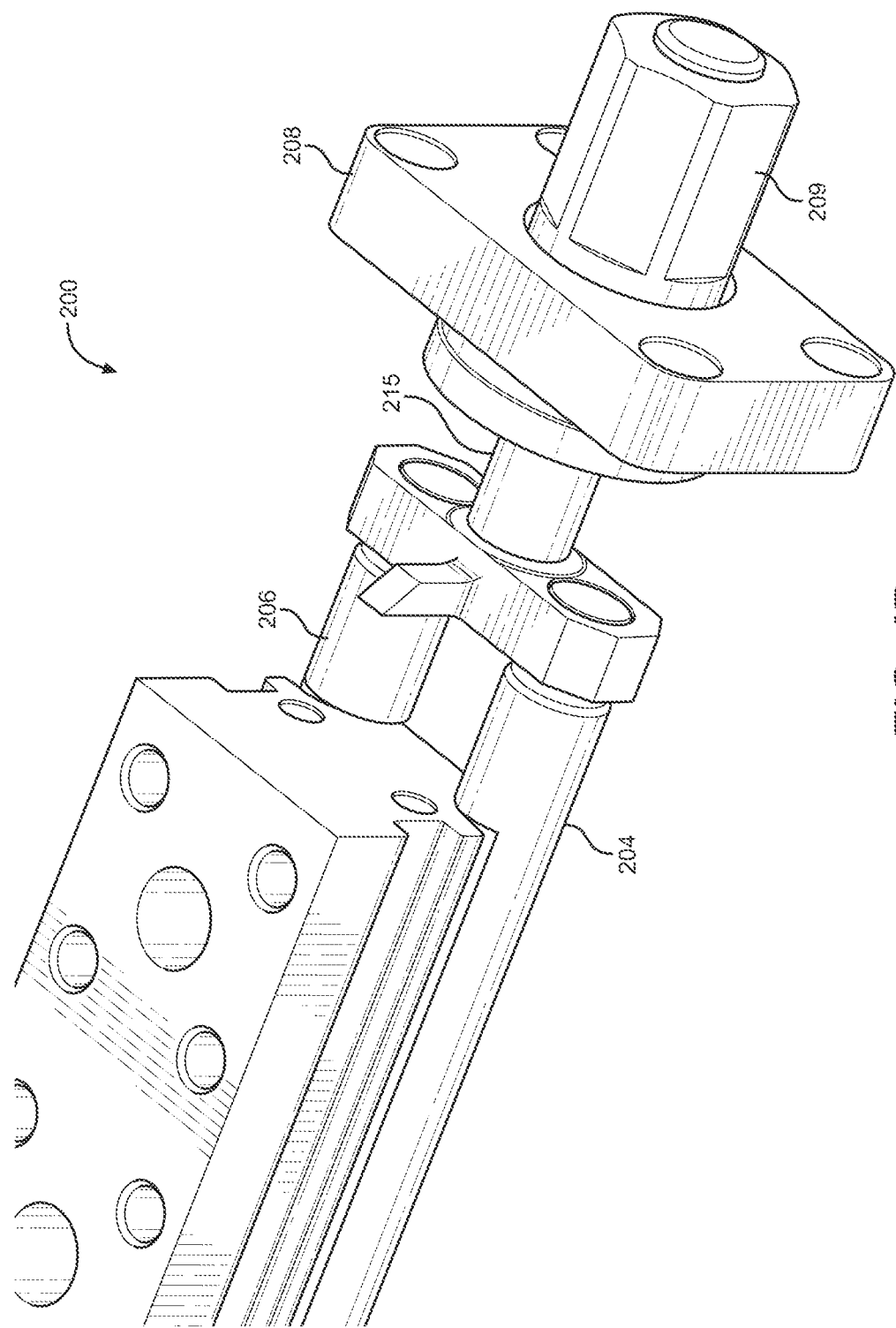
FIGS. 4D and 4E illustrate perspective views of an end of the tuning assembly shown in FIG. 4A.
Figure 4E:
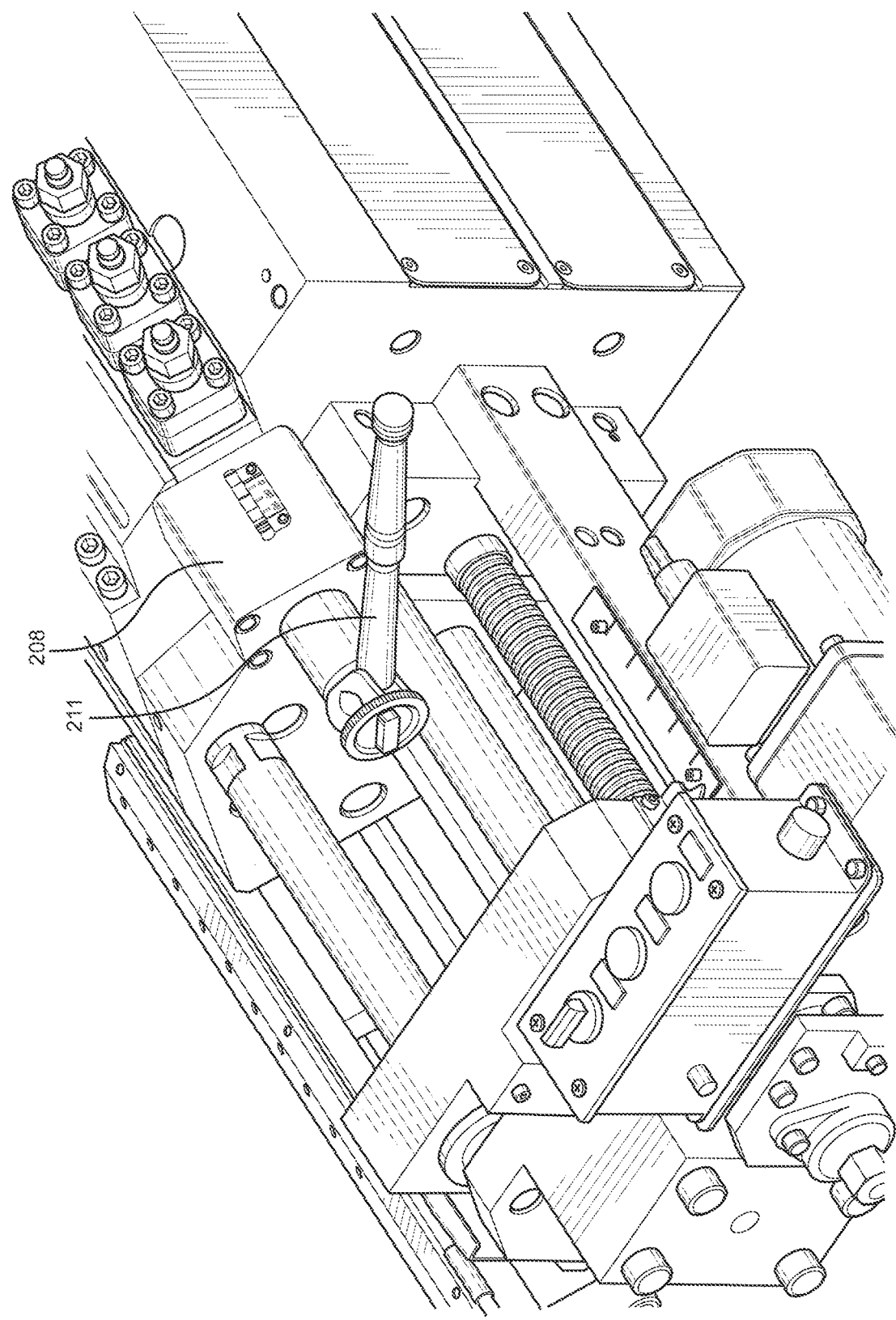
Figure 5B:
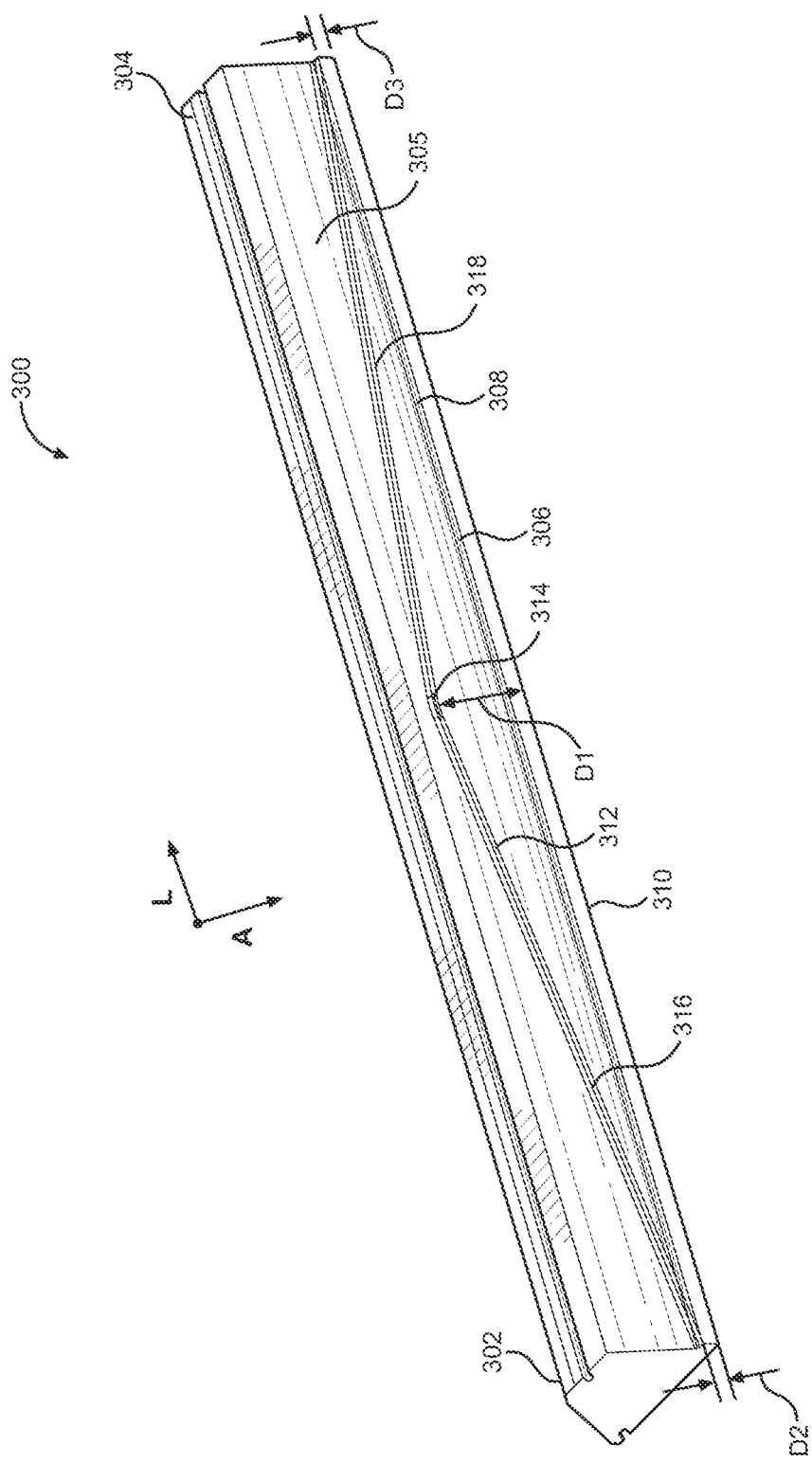
FIG. 5B illustrates a bottom perspective view of the restrictor member shown in FIG. 5A.
Figure 5C:
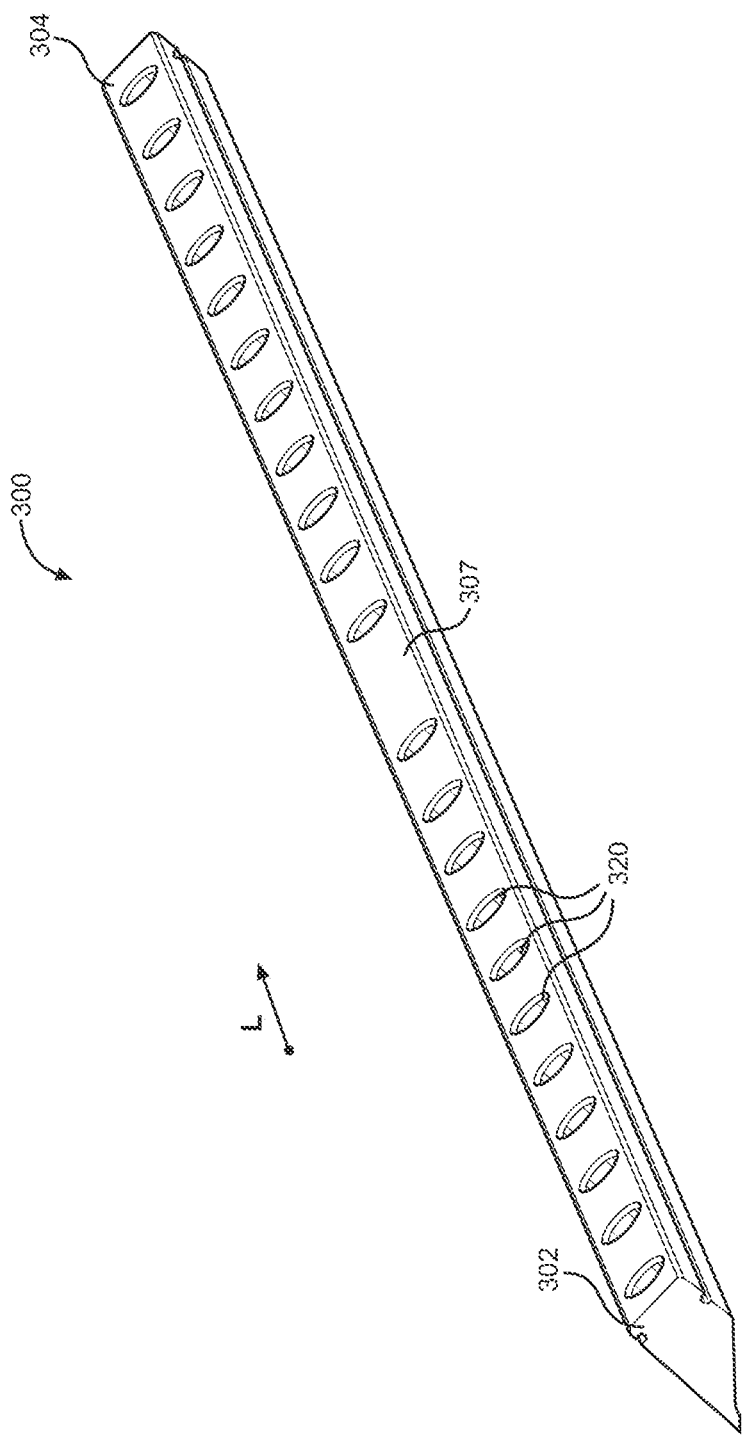
FIG. 5C illustrates a rear perspective view of the restrictor member shown in FIG. 5A.
Figure 5D:
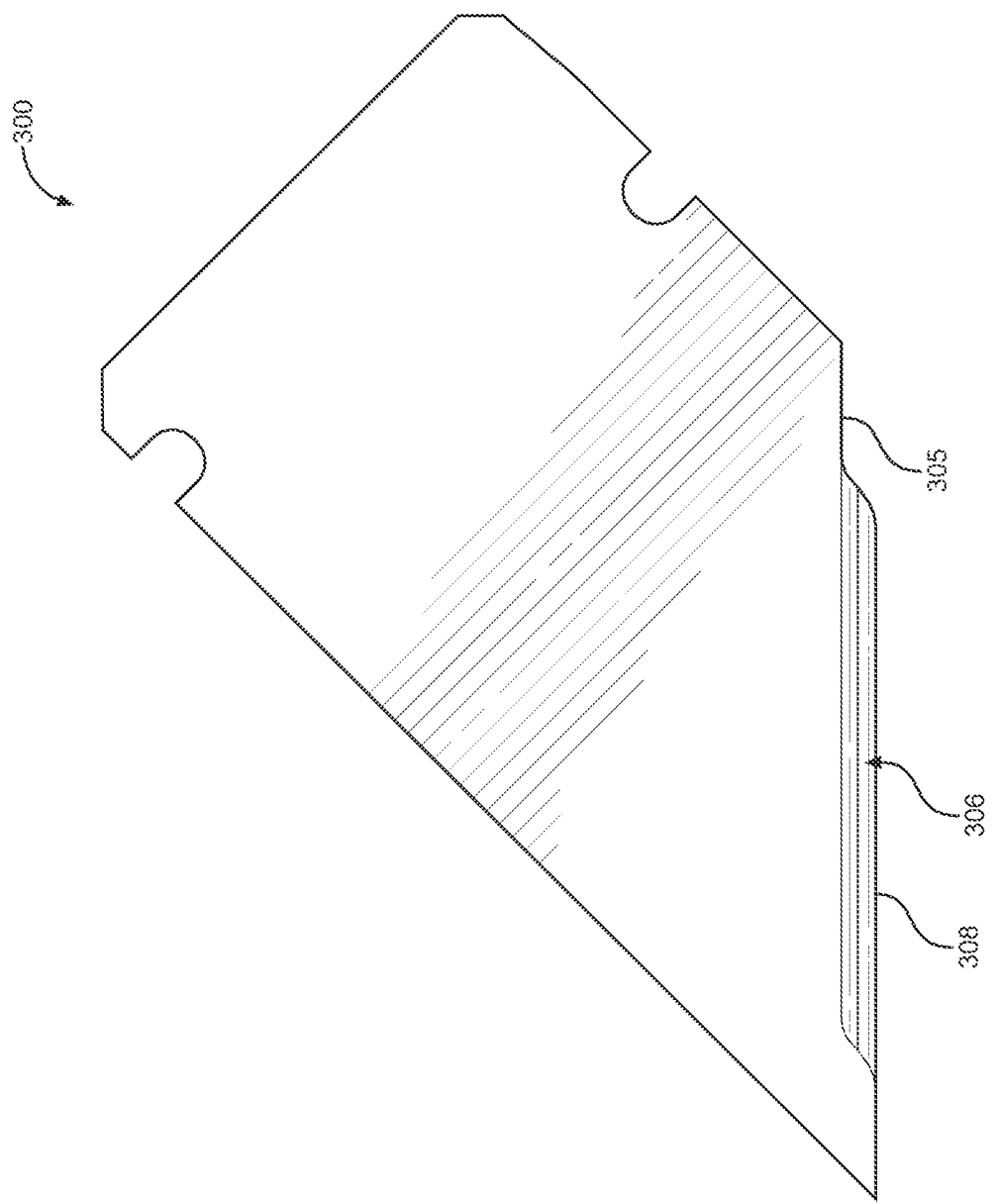
FIG. 5D illustrates a side view of the restrictor member shown in FIG. 5A.

FIGS. 4D and 4E illustrate a perspective view of an end of the tuning assembly 200, according to an aspect of this disclosure. The single point adjustment member 209 may be rotated using a ratchet 211, or other similar tool, to operate the adjustment control 208 as described above. The single point adjustment member 209 is coupled to a stud 215 that has a screw-like configuration, such that rotation of the stud 215 in one direction causes movement in the longitudinal direction L, and rotation of the stud 215 in another direction causes movement in the direction opposing the longitudinal direction L. The stud is coupled to the first and second adjustment members 204 and 206, either directly or indirectly, such that the rotation of the stud 215 causes movement of the first and second adjustment members 204 and 206.

FIGS. 5A through 5D illustrate the restrictor member 300, according to an aspect of this disclosure. The restrictor member 300 extends in the longitudinal direction L from a first end 302 to a second end 304. The restrictor member 300 includes a first surface 305, a second surface 307, and a preland drop 306 formed on the first surface 305. In alternative aspects, the preland drop 306 may be coupled to or attached to the first surface 305. The preland drop 306 has an upper preland surface 308 that is substantially parallel to the first surface 305, and includes a first edge 310 and a second edge 312. Both the first edge 310 and the second edge 312 extend from the first end 302 to the second end 304 of the restrictor member 300. The first edge 310 is spaced from the second edge 312 in the axial direction A, and the first edge 310 extends substantially parallel to the longitudinal direction L. The second edge 312 includes a bend 314 located between the first end 302 and the second end 304. In an aspect, the bend 314 is located at a center of the second edge 312 in the longitudinal direction L.

The bend 314 is spaced from the first edge 310 by a distance D1 in the axial direction A. In an aspect, the distance D1 is the greatest distance the second edge 312 is spaced from the first edge 310 in the axial direction at any point along the second edge 312. The second edge 312 is spaced from the first edge 310 in the axial direction A at the first end 302 of the restrictor member 300 by a distance D2. The distance D1 is greater than the distance D2. The second edge 312 is spaced from the first edge 310 in the axial direction A at the second end 304 of the restrictor member 300 by a distance D3. The distance D1 is greater than the distance D3.

The second edge 312 includes a first edge portion 316 and a second edge portion 318. The first edge portion 316 extends from the first end 302 to the bend 314, and the second edge portion 318 extends from the bend 314 to the second end 304. In an aspect, both of the first and second edge portions 316 and 318 are substantially linear. In another alternative aspect, both of the first and second 316 and 318 are angularly offset from the longitudinal direction L. The first edge portion 316 may be a mirror image of the second edge portion 318 when viewed in the axial direction A.

The second surface 307 of the restrictor member 300 extends in the longitudinal direction L from the first end 302 to the second end 304. The second surface 307 includes a plurality of openings 320. The plurality of openings 320 are spaced along the surface 307 from the first end 302 to the second end 304.

Figure 7:
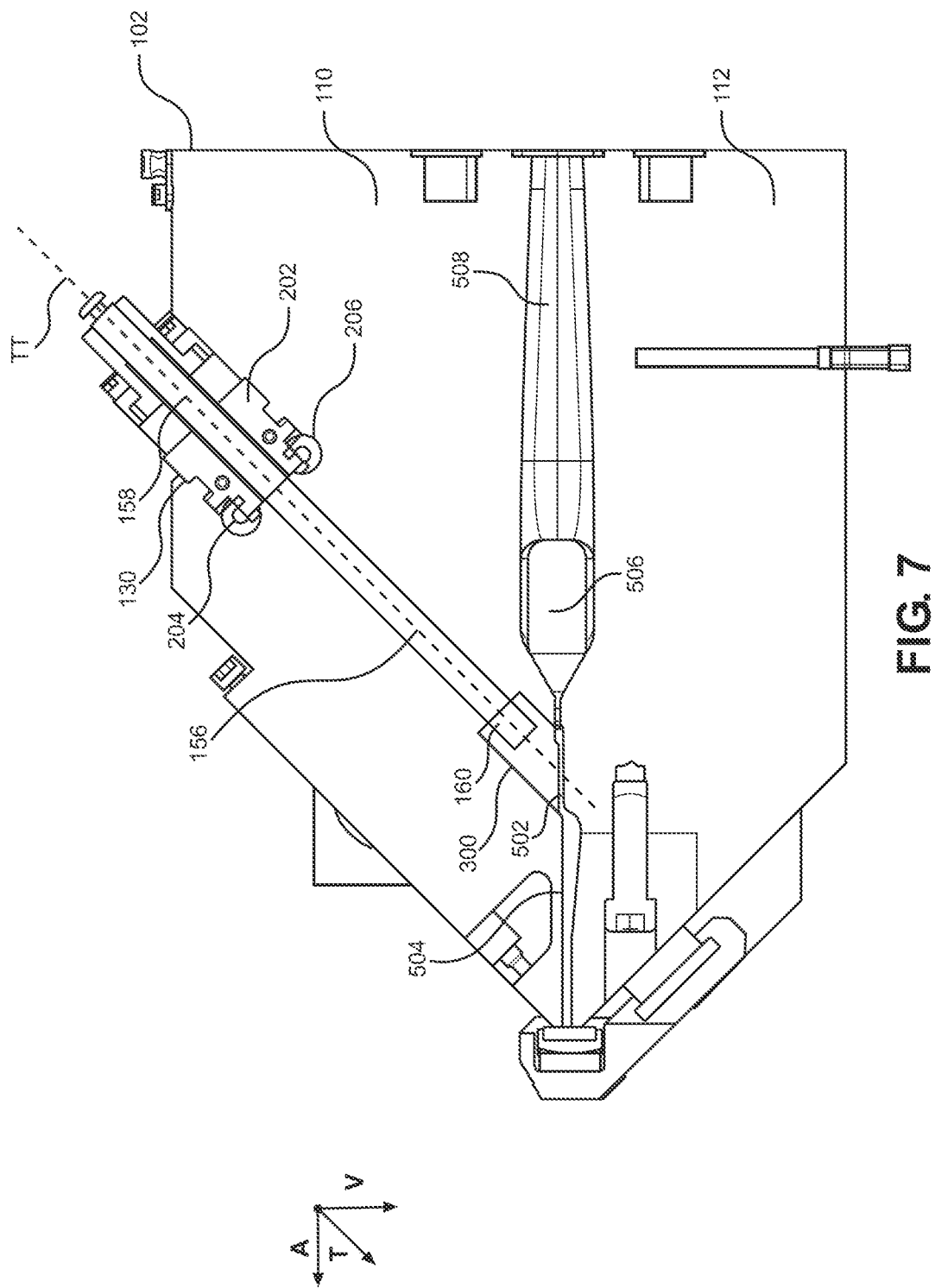
FIG. 7 illustrates a side cross sectional view of the extrusion die shown in FIG. 1 taken along line 2-2.

FIGS. 6 and 7 illustrate a cross section of the extrusion die 100 taken along line 2-2 in FIG. 1 showing a perspective view and a side view, respectively. The tuning channel 130 is configured to receive at least a portion of the tuning assembly 200 within. The wedge member 202, the first adjustment member 204, and second adjustment member 206 extend through the tuning channel 130 in the longitudinal direction L. The notches 210a,b of the wedge member 202 are configured to receive the shoulders 140a,b of the upper body member 110 within.

Each of the plurality of studs 156 has a first end 158 and an opposing second end 160. Each of the plurality of studs 156 is positioned within a respective channel of the plurality of stud channels 134 of the upper body member 110 and extends in the transverse direction T. Each of the plurality of studs 156 extend through a respective hole of the plurality of through holes 214 of the wedge member 202. The wedge member 202 is coupled to the plurality of studs 156 at a location proximate to the first ends 158. Each of the plurality of studs 156 are positioned within a respective opening of the plurality of openings 320 of the restrictor member 300. The restrictor member 300 is coupled to each of the second ends 160 of the plurality of studs 156. In an aspect, the number of studs 156, stud channels 134, through holes 214, and openings 320 is the same, such that for every stud channel 134, through hole 214, and opening 320, a stud 156 is positioned within.

The restrictor channel 132 is configured to receive the restrictor member 300 within. The restrictor member 300 is configured to slide within the restrictor channel 132 in the transverse direction.

The lower body member 112 is positioned adjacent to the upper body member 110 in a vertical direction V. The vertical direction V is substantially perpendicular to the longitudinal direction L. The upper preland surface 308 of the restrictor member 300 confronts the lower preland surface 144 of the lower body member 112 forming a preland channel 502 therebetween. The lower land surface 148 of the lower body member 112 confronts the upper land surface 138 of the upper body member 110 forming a final land channel 504 therebetween. The lower entry channel 142 of the lower body member 112 confronts the upper entry channel 136 of the upper body member 110 forming an entry channel 506 therebetween. The entry channel 506 may also be referred to as a "distribution chamber" or "distribution channel." The lower port channel 143 of the lower body member 112 confronts the upper port channel 137 of the upper body member 110 forming a port channel 508 that extends from the back end 102 of the extrusion die 100 to the entry channel 506.

The port channel 508, the entry channel 506, the preland channel 502, and the final land channel 504 are in fluid communication with one another such that the back end 102 of the extrusion die is in fluid commutation with a die opening 510 formed between the upper body member 110 and the lower body member 112 at the dispensing end 104.

A distance between the lower land surface 148 of the lower body member 112 and the upper land surface 138 of the upper body member 110 defines a height of the preland channel 502. The height of the preland channel 502 is adjusted based on the movement of the restrictor member 300 in the transverse direction T. In an aspect, the lower land surface 148 is substantially parallel to the upper land surface 138.

The movement of the restrictor member 300 along a transverse axis TT is controlled by the tuning assembly 200. The transverse axis TT extends parallel to the transverse direction T. As described above, rotation of the first adjustment member 204 about the first rotation axis R1 in the clockwise direction and rotation of the second adjustment member 206 about the second rotation axis R2 in the counter clockwise direction causes the wedge member 202 to move in the downward direction (e.g. transverse direction T), which forces the plurality of studs 156 and the restrictor member 300 to move in the transverse direction T. As the restrictor member 300 moves in the transverse direction T, the height of the preland channel 502 is reduced. Conversely, rotation of the first adjustment member 204 about the first rotation axis R1 in the counter clockwise direction and rotation of the second adjustment member 206 about the second rotation axis R2 in the clockwise direction causes the wedge member 202 to move in the upward direction (e.g. opposite the transverse direction T), which forces the plurality of studs 156 and the restrictor member 300 to move in a direction opposite to the transverse direction T. As the restrictor member 300 moves in the direction opposite to the transverse direction T, the height of the preland channel 502 is increased.

In an aspect, the restrictor member 300 may be moved substantially uniformly in the transverse direction T along the transverse axis TT. For example, when the tuning assembly 200 controls the restrictor member 300 to move along the transverse axis TT, the first end 302, the second end 304, and points on the restrictor member 300 between the first end 302 and the second end 304 may move a substantially similar distance along the transverse axis TT.

Figure 8:
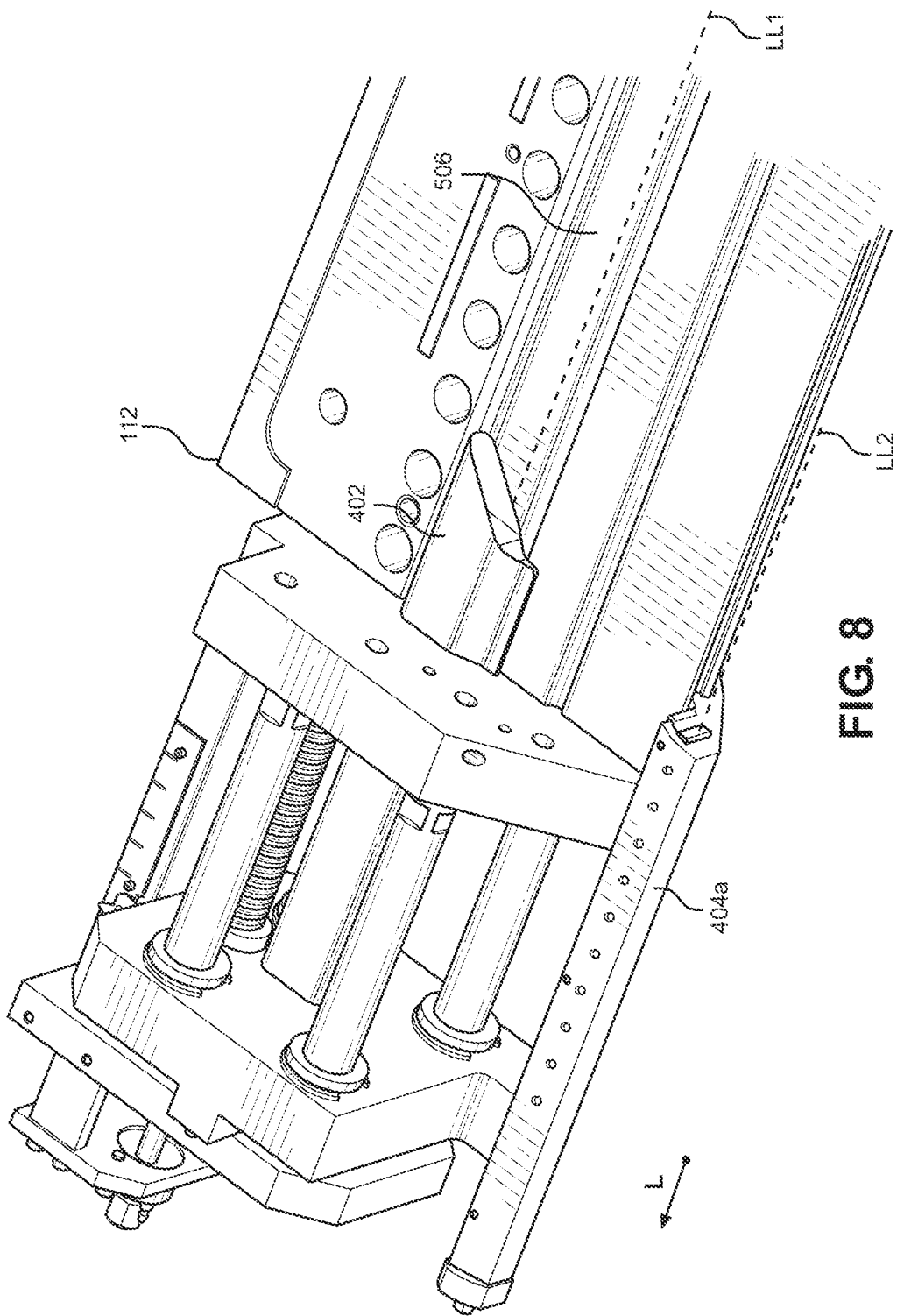
FIG. 8 illustrates a top perspective view of the extrusion die shown in FIG. 1 with the upper body member shown in FIGS. 2A and 2B removed.

FIG. 8 illustrates a top perspective view of the extrusion die 100 with the upper body member 110 removed. The deckle system 400 includes an internal manifold plug 402 and an external deckle 404a. The internal manifold plug 402 is positioned within the entry channel 506. The internal manifold plug 402 is configured to slide within the entry channel 506 along a first longitudinal axis LL1. The first longitudinal axis LL1 is substantially parallel to the longitudinal direction L. The external deckle 404a is positioned at the dispensing end 104 of the extrusion die 100 adjacent to the die opening 510. The external deckle 404a is configured to slide along a second longitudinal axis LL2. The second longitudinal axis LL2 is substantially parallel to the longitudinal direction L.

It will be appreciated that the deckle system 400 may also include a second internal manifold plug (not visible in figures) and a second external deckle 404b. The internal manifold plug 402 may be positioned at the first end 106 and the second internal manifold plug may be positioned at the second end 108 of the extrusion die 100. The movement of the internal manifold plug 402 at the first end 106 and the movement of the second internal manifold plug at the second end 108 may be consistent. For example, as the internal manifold plug 402 located towards the first end 106 moves along the first longitudinal axis LL1 away from the first end 106, the second internal manifold plug 402 located towards the second end 108 moves along the first longitudinal axis LL1 away from the second end 108, such that distance the plug 402 has traveled from the first end 106 is substantially the same as the distance the second plug has traveled away from the second end 108.

The external deckle 404a is positioned at the first end 106 and the second external deckle 404b is positioned at the second end 108 of the extrusion die 100. The movement of the external deckle 404a and the movement of the second external deckle 404b may be consistent. For example, as the external deckle 404a moves along the second longitudinal axis LL2 away from the first end 106, the second external deckle 404b moves along the second longitudinal axis LL2 away from the second end 108, such that the distance the external deckle 404a has traveled from the first end 106 is substantially the same as the distance the second external deckle 404b has traveled away from the second end 108.

In an aspect, the internal manifold plug 402 and the external deckle 404a may move together. For example, when the internal manifold plug 402 moves away from the first end 106, the external deckle 404a moves a substantially similar distance away from the first end 106 as the internal manifold plug 402. Similarly, the second internal manifold plug and the second external deckle 404b may move together. For example, when the second internal manifold plug moves away from the second end 108, the second external deckle 404b moves a substantially similar distance away from the second end 108 as the second internal manifold plug.

A method for using the extrusion die 100 for dispensing a fluid through the die opening 510 commences by providing the fluid to an entrance of the port channel 508 at the back end 102 of the extrusion die 100. One of more extruders (not shown) may be used to feed the entrance of the port channel 508 to deliver a precise volume of fluid into the port channel 508. The amount of fluid depends on a desired sheet thickness that exits the roll stack.

The fluid flows through the port channel 508 and into the entry channel 506. The fluid is distributed longitudinally as it enters into and fills the entry channel 506. As the fluid flow exits the entry channel 506 in the axial direction A, a height of the fluid (e.g. fluid height in the vertical direction V) is reduced and the fluid flows into the preland channel 502. The height of the preland channel 502 may be adjusted, as described above, to balance the flow distribution through the preland channel 502. The height of the preland channel 502 between the first surface 305 and the lower preland surface 144 is greater than the height of the preland channel 502 between the upper preland surface 308 and lower preland surface 144, and the distance D1 from the from the first edge 310 to the bend 314 of the preland drop 306 in relation to the D2 and D3 distances at the ends 302 and 304, respectively, of the preland drop 306 form a "longer land" towards a center of the preland channel 502. The longer land promotes flow towards the ends 106 and 108 of the extrusion die 100. Increasing the height of the preland channel 502 increases the flow towards a center of the extrusion die 100. Reducing the height of the preland channel 502 increases the flow towards the ends 106 and 108 of the extrusion die 100. This method is effective in balancing the flow distribution for a variety of resin types and operation conditions (e.g. flow rate and melt processing temperature).

As the fluid exits the preland channel 502, it enters into the final land channel 504. The fluid flows through the final land channel 504 and out the die opening 510 at the dispensing end 104 of the extrusion die 100 and into a roll stack.

The deckle system 400 allows for additional control of the flow of the fluid through the extrusion die 100. The width of fluid flow along the first longitudinal axis LL1 within the entry channel 506 is controlled by the internal manifold plug 402 and the second internal manifold plug. For example, as the internal manifold plug 402 and the second internal manifold plug move away from the first end 106 and the second end 108, respectively, towards a center of the extrusion die 100, the flow of the fluid through the entry channel 506 is narrowed. In a similar manner, as the internal manifold plug 402 and the second internal manifold plug move towards the first end 106 and the second end 108, respectively, of the extrusion die 100, the flow of the fluid through the entry channel 506 is widened.

The width of the fluid flow along the second longitudinal axis LL2 at the die opening 510 is controlled by the external deckle 404a and the second external deckle 404b. The movement of the external deckle 404a and the second external deckle 404b narrow and widen the flow of fluid through the die opening 510 in a substantially similar manner as the movement of the internal manifold plug 402 and the second internal manifold plug narrow and widen the flow of fluid through the entry channel 506. The combined movement of the internal manifold plug 402, the second internal manifold plug, the external deckle 404a, and the second external deckle 404b may help to prevent having to adjust the restrictor member 300 very aggressively at the ends 106 and 108 of the extrusion die 100.

It will be appreciated that the extrusion die 100 may operate without the deckle system 400, with either one of the internal manifold plug 402 and external deckles 404a,b incorporated onto the extrusion die 100, or with both of the internal manifold plug 402 and deckles 404ab incorporated onto the extrusion die 100.

These specific embodiments described above are for illustrative purposes and are not intended to limit the scope of the disclosure as otherwise described and claimed herein. Modification and variations from the described embodiments exist.

What is claimed is:

1. An extrusion die, comprising:
   a plurality of studs, each of the plurality of studs having a first end and a second end;
   a tuning assembly extending in a longitudinal direction, said tuning assembly comprising:
      a wedge member coupled to said plurality of studs at a location proximate to each of said first ends, said wedge member having a first plurality of channels and a second plurality of channels formed within, each of said first and second plurality of channels extending in a direction that is angularly offset from the longitudinal direction,
      a first adjustment member having a first plurality of protrusions, each of the first plurality of protrusions positioned within a respective one of said first plurality of channels,
      a second adjustment member having a second plurality of protrusions, each of the second plurality of protrusions positioned within a respective one of said second plurality of channels, and
      an adjustment control having a single rotatable point adjustment member coupled to said first and second adjustment members; and
   a restrictor member extending in the longitudinal direction, said restrictor member coupled to each of said second ends of said plurality of studs,
   said rotatable single point adjustment member being capable of rotation about an axis which is substantially parallel to the longitudinal direction and which causes each of said first and second plurality of protrusions to move along the longitudinal direction within each respective one of said first and second plurality of channels forcing said wedge member, said plurality of studs, and said restrictor member to move in a direction that is substantially perpendicular to the longitudinal direction.

2. The extrusion die of claim 1, wherein each of said plurality of studs extends through said wedge member, and wherein each of said plurality of studs is spaced substantially equidistant from one another along said wedge member in the longitudinal direction.

3. The extrusion die of claim 2, wherein the wedge member has a plurality of through holes extending therethrough, and wherein each of the plurality of studs extend through a respective one of the plurality of through holes.

4. The extrusion die of claim 1, wherein said first plurality of channels extend in a direction that is substantially parallel to a direction that said second plurality of channels extend.

5. The extrusion die of claim 4, wherein rotation of said single rotatable point adjustment member causes said first and second adjustment members to move along a longitudinal axis.

6. The extrusion die of claim 1, wherein said restrictor member includes a plurality of openings, wherein each of said plurality of openings is configured to receive the second end of a respective one of said plurality of studs.

7. The extrusion die of claim 1, further comprising:
   an upper body member extending in the longitudinal direction from a first end of the extrusion die to a second end of the extrusion die, said upper body member including:
      a tuning channel extending in the longitudinal direction, said tuning channel configured to receive said tuning assembly within,
      a restrictor channel extending in the longitudinal direction, said restrictor channel configured to receive said restrictor member within, and
      a plurality of stud channels extending in the direction that is substantially perpendicular to the longitudinal direction, each of said plurality of stud channels configured to receive a respective one of said plurality of studs.

8. The extrusion die of claim 7, further comprising:
   a lower body member extending in the longitudinal direction from the first end of the extrusion die to the second end of the extrusion die, said lower body member positioned adjacent to said upper body member in a vertical direction, wherein the vertical direction is substantially perpendicular to the longitudinal direction, said lower body member including a lower preland surface,
   wherein said lower preland surface confronts an upper preland surface of the restrictor member forming a preland channel therebetween, wherein a height of the preland channel between the lower preland surface and said upper preland surface is adjusted based on the rotation of the single rotatable point adjustment member.

9. The extrusion die of claim 8, wherein the upper body member and the lower body member form a distribution channel therebetween, the extrusion die further comprising:
   an internal manifold plug slidably positioned within said distribution channel.

10. The extrusion die of claim 9, wherein said upper body member and said lower body member form a die opening that is in fluid communication with said preland channel and said distribution channel, the extrusion die further comprising:
    an external deckle slideably positioned at the die opening.

11. The extrusion die of claim 8, wherein said upper preland surface is substantially parallel to the lower preland surface.

12. The extrusion die of claim 8, wherein said upper preland surface includes a first edge and a second edge, said first edge and said second edge extending from a first end to a second end of said restrictor member, said first edge being spaced from said second edge in an axial direction, the axial direction being substantially perpendicular to both the longitudinal direction and the vertical direction, said second edge having a bend located between the first end and the second end of the restrictor member, wherein a distance from said first edge to said bend in the axial direction is greater than a distance from said first edge to said second edge at the first end of said restrictor member in the axial direction, wherein said upper preland surface, said first edge, and said second edge compose a preland drop, said preland drop being formed on a first surface of the restrictor member, said first surface and said upper preland surface being substantially parallel.

13. The extrusion die of claim 1, wherein said restrictor member comprises:
a first surface extending in the longitudinal direction from a first end of the restrictor member to a second end of the restrictor member;
a second surface extending in the longitudinal direction from the first end of the restrictor member to the second end of the restrictor member, the second surface including a plurality of openings, each of said plurality of openings configured to receive one of a plurality studs therein; and
a preland drop formed on said first surface, said preland drop having a preland surface that includes a first edge and a second edge, said first edge and second edge extending from the first end to the second end of said restrictor member, said second edge spaced from said first edge in an axial direction, the axial direction being substantially perpendicular to the longitudinal direction, said second edge having a bend located between the first end and the second end of the restrictor member,
wherein a distance from said first edge to the bend in the axial direction is greater than a distance from said first edge to the second edge at the first end of the restrictor member in the axial direction.

14. The restrictor member of claim 13, wherein a distance from said first edge to the bend in the axial direction is greater than a distance from said first edge to the second edge at the second end of the restrictor member in the axial direction.

15. The restrictor member of claim 13, wherein said bend is located in a center of the second edge in the longitudinal direction.

16. The restrictor member of claim 13, wherein said second edge includes a first portion and a second portion, the first portion extending from the first end of said restrictor member to said bend, and said second portion extending from said bend to the second end of said restrictor member, wherein said first portion and said second portion are angularly offset from the longitudinal direction.

17. The restrictor member of claim 16, wherein said first portion of said second edge is a mirror image of said second portion of said second edge when viewed in the axial direction.

18. The restrictor member of claim 13, wherein said first edge extends substantially parallel to the longitudinal direction from said first end of said restrictor member to said second end of said restrictor member.

19. The restrictor member of claim 13, wherein said preland surface is substantially parallel to said first surface.

* * * * *